United States Patent [19]

Sorensen

[11] 3,727,387
[45] Apr. 17, 1973

[54] FRUIT HARVESTER

[76] Inventor: Francis G. Sorensen, 6333 South Friends Avenue, Whittier, Calif. 90602

[22] Filed: Mar. 20, 1969

[21] Appl. No.: 808,799

[52] U.S. Cl. ............................................56/328 R
[51] Int. Cl. ..........................................A01g 19/00
[58] Field of Search.................................56/328 R

[56] References Cited

UNITED STATES PATENTS

| | | | |
|---|---|---|---|
| 2,916,868 | 12/1959 | Ramacher et al. | 56/328 |
| 3,127,725 | 4/1964 | Richardson | 56/328 |
| 3,153,311 | 10/1964 | Pool | 56/328 |
| 3,404,521 | 10/1968 | Thorn et al. | 56/328 |
| 3,413,786 | 12/1968 | Wehr | 56/328 |
| 3,427,796 | 2/1969 | Mc Cray et al. | 56/328 |
| 3,452,526 | 7/1969 | Steingas et al. | 56/328 |
| 3,468,111 | 9/1969 | Hanscom, Jr. | 56/328 |
| 3,475,888 | 11/1969 | Staats, Sr. et al. | 56/328 |

FOREIGN PATENTS OR APPLICATIONS

| | | | |
|---|---|---|---|
| 1,506,223 | 12/1967 | France | 56/328 |

*Primary Examiner*—Louis G. Mancene
*Assistant Examiner*—James A. Oliff
*Attorney*—Fraser and Bogucki

[57] ABSTRACT

A fruit harvester of the tree-combing type in which the tines are movable relative to one another to clear obstructions in the tree. A rotatable helix, positioned over the rear portion of the tines, cooperates with branch-holding devices carried by the tines to gently separate the fruit from the branches. The tines are tapered along their lengths to present small frontal cross-sections and thereby facilitate insertion into the tree crown.

15 Claims, 13 Drawing Figures

INVENTOR.
FRANCIS G. SORENSEN
By FRASER & BOGUCKI
ATTORNEYS.

INVENTOR.
FRANCIS G. SORENSEN
By FRASER & BOGUCKI
ATTORNEYS.

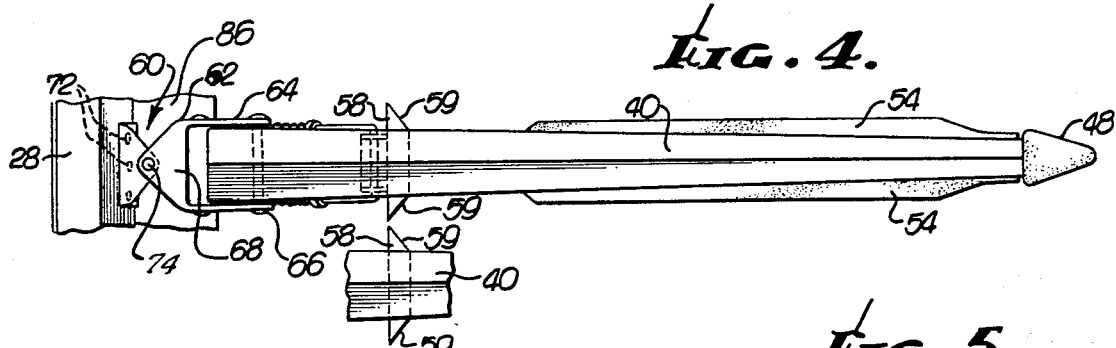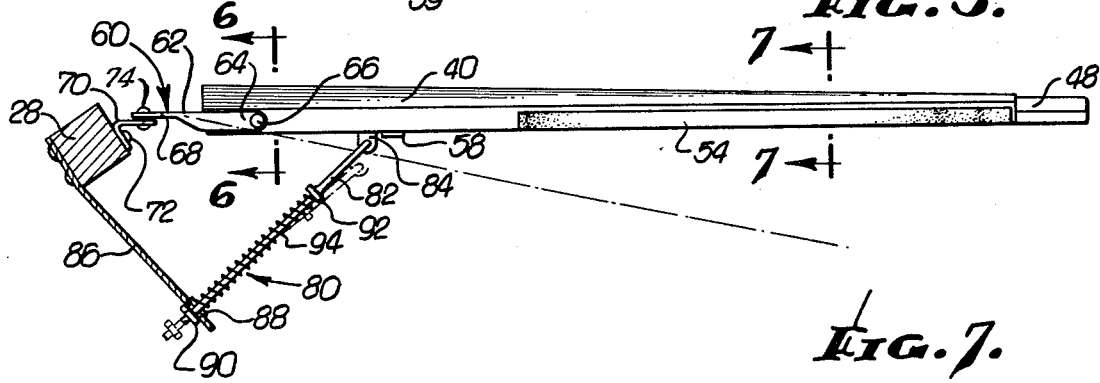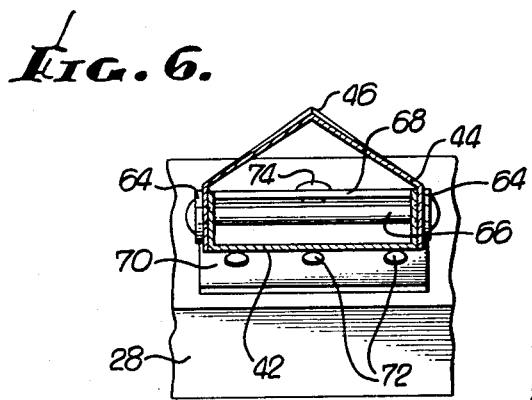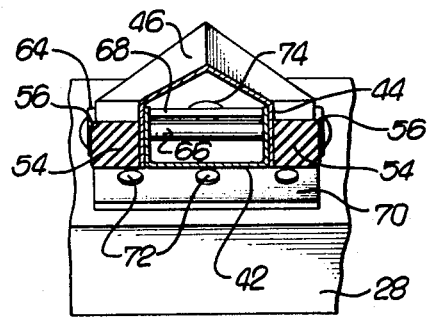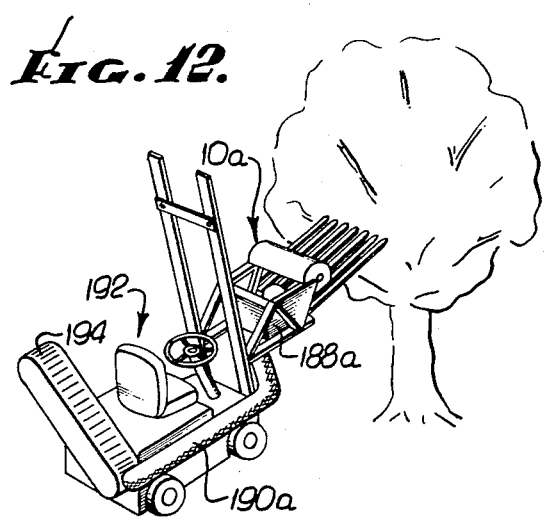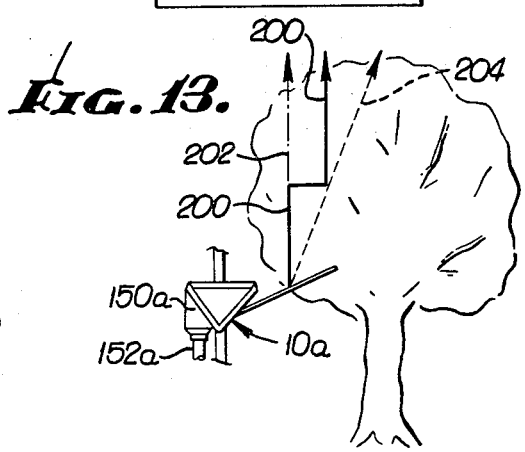

FRUIT HARVESTER

FIELD OF THE INVENTION

This invention relates generally to fruit harvesters and particularly to fruit harvesting apparatus of the tree-combing type for removing fruit from trees, such as orange and grapefruit trees, upon which all of the fruit ripens substantially at one time.

BACKGROUND OF THE INVENTION

Despite many attempts to mechanize the operation by which various citrus fruits are picked from trees, this operation has eluded efficient mechanization and consequently, the harvesting of citrus trees is still largely accomplished by hand. The primary problem is that, by nature, citrus fruits are structurally delicate and therefore easily damaged during the picking operation unless handled gently.

Although picking fruit by hand has certain advantages and may be considered "efficient" in the sense that it normally results in low fruit loss during the picking operation, little or no damage to the tree and permits a relatively high degree of selectivity with respect to the fruit picked, it is, of course, a time consuming and costly process. Thus, the overall goal of mechanization is to duplicate or approach the advantages of handpicking while simultaneously speeding up the picking operation and decreasing its cost. Primarily, fruit losses should not be in excess of manual picking.

DESCRIPTION OF THE PRIOR ART

The prior art includes a variety of tree-combing devices which are adapted to be moved through the crown of the tree and which, usually with the assistance of some sort of separating mechanism, remove the fruit from the branches. The tines of existing comb devices, however, are either fixed or disposed in such fashion that both the fruit and the tree may be easily bruised and only a small range of fruit sizes can be handled. Penetration is also limited and consequently, the percentage of the total fruit that can be picked is relatively low. Nor can obstructions such as large branches be easily cleared, necessitating the retraction of the apparatus from the tree crown and reinsertion at a different location.

In almost all examples of existing tree combing apparatus, some type of mechanism is used to grasp the fruit and impart to the fruit some form of motion, usually rotational, relative to the branch to effect separation. None of the known mechanisms, however, are capable of effecting such separation without damage to a relatively large percentage of the fruit harvested.

BRIEF SUMMARY OF THE INVENTION

The fruit harvesting apparatus of the present invention is capable of quickly and efficiently removing citrus fruit from trees with minimal fruit loss and without damage to the tree. The invention overcomes the deficiencies of the prior combing apparatus by utilizing, according to one aspect of the invention, tines designed for deep penetration and which are movable relative to one another and to the supporting frame so as to deflect as necessary to clear obstructions such as heavy branches and thereby prevent damage to the tree without having to retract the apparatus from the tree crown for reinsertion at a different location.

The present invention also utilizes, according to another aspect, a novel fruit separating mechanism, generally in the form of a rotatable helix element and positioned over the tines and branch-holding elements carried by the tines, which virtually eliminate the possibility of bruising the fruit during separation of the fruit from the branch.

In accordance with one specific example of the fruit harvesting apparatus of the present invention, a comb assembly is provided which includes a plurality of projecting tines pivotally mounted on a frame and resiliently biased into substantially coplanar, parallel, spaced relation. The assembly is mounted on a suitable carriage or vehicle. The tines are individually pivotable both laterally and downwardly in response to engagement with obstructions in the tree to thereby clear the obstructions during movement of the comb assembly through the tree.

Another aspect of the invention in one specific form comprises a fruit separating mechanism including a double, oppositely pitched, pliable helix member rotatably mounted on the comb assembly frame and disposed above the rear portions of the tines transversely thereto. The fruit not separated by the combing action per se slides down between adjacent pairs of tines until the helix member is reached. The helix gently imparts to the fruit both a twisting movement and a rearward movement. While the helix engages the fruit, the branch carrying the fruit is held by guide plates projecting laterally from the tines. In this way, the branch is held essentially fixed while the action of the helix upon the fruit is effective to separate the fruit from the branch. The separated fruit then moves off the rear of the tines into a suitable conveyor or receptacle means.

Another more specific aspect of the present invention is the shape of the tines themselves. Each tine may be tapered along its length to present the smallest possible frontal cross-setion and thereby reduce the probability of interference with branches upon insertion of the comb assembly. If the comb assembly is to be used for harvesting fruit having a relatively large size range, the spaces between the tines may be reduced to trap small fruit by attaching laterally projecting pliable members to the sides of the tines.

The combing action of the apparatus damages neither blossoms nor young fruit and serves to prune the tree, removing dead and dry branches.

BRIEF DESCRIPTION OF THE DRAWINGS

Other aspects and advantages of the present invention will become apparent by reference to the following detailed description, taken in conjunction with the accompanying drawings, in which:

FIG. 4 is a top view of one of the tines of the apparatus of FIG. 1;

FIG. 5 is a side view of the tine of FIG. 4;

FIG. 6 is a transverse cross-section of the tine of FIG. 5 along the plane 6—6;

FIG. 7 is a transverse cross-section of the tine of FIG. 5 along the plane 7—7;

FIG. 12 is a perspective view of an embodiment of the fruit harvesting apparatus of the present invention mounted on a fork lift vehicle; and FIG. 13 is a schematic side elevation view of a portion of the fruit harvesting apparatus of the present invention showing various paths which may be followed in moving the apparatus through the crown of a tree.

DETAILED DESCRIPTION

Figure 1:
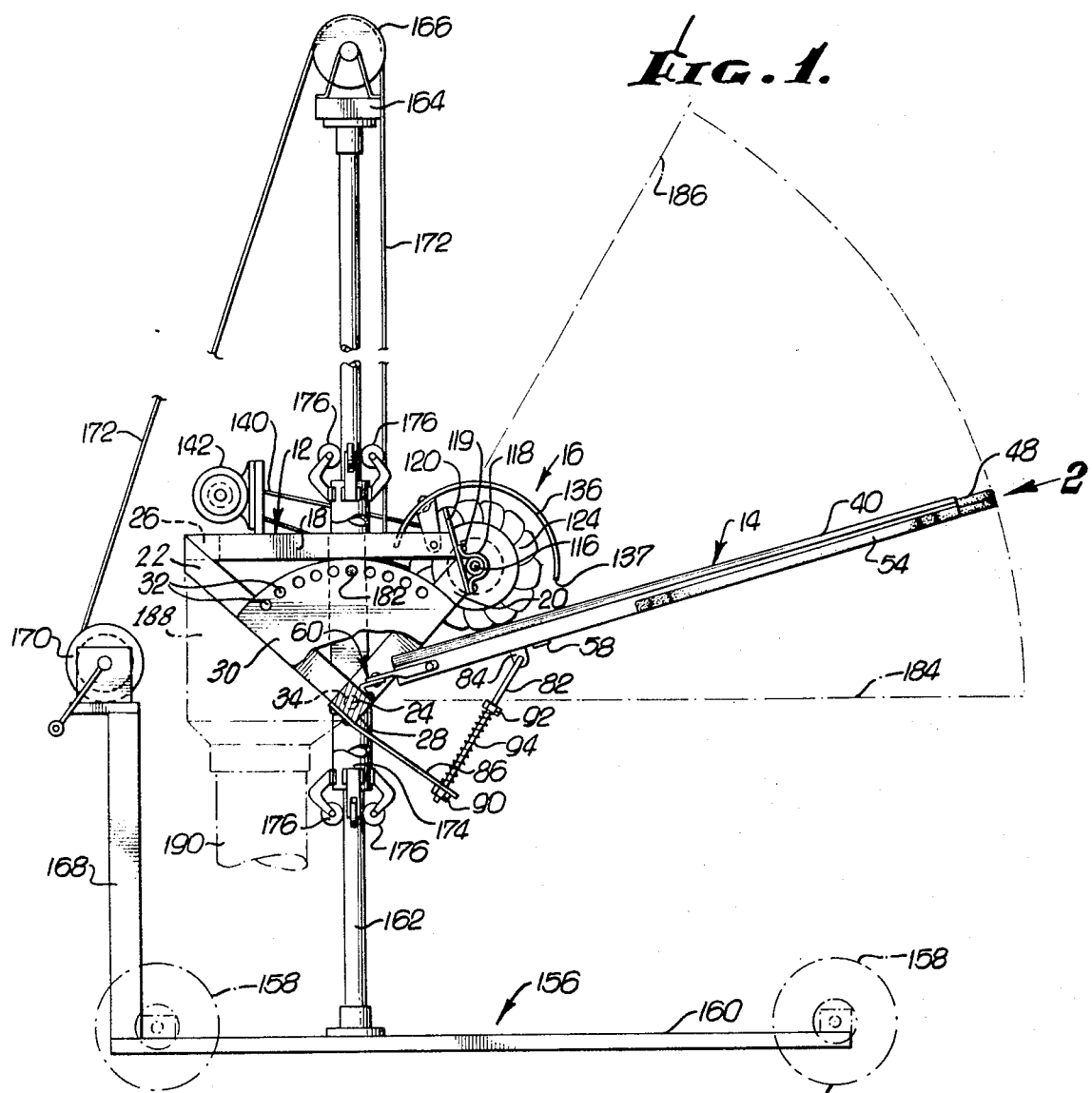
FIG. 1 is a side elevation view, partially broken away, of one embodiment of the fruit harvesting apparatus of the present invention.
Figure 2:
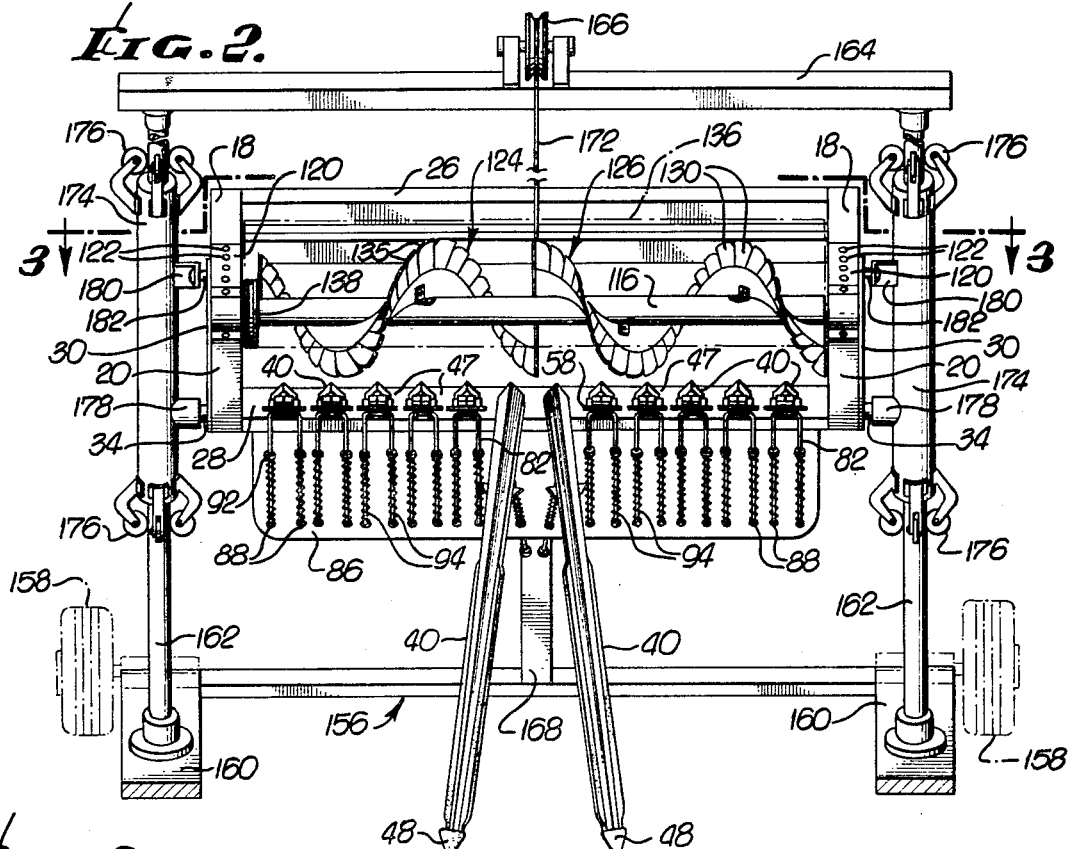
FIG. 2 is a front view of the apparatus of FIG. 1 as seen along the arrow 2 in FIG. 1.
Figure 3:
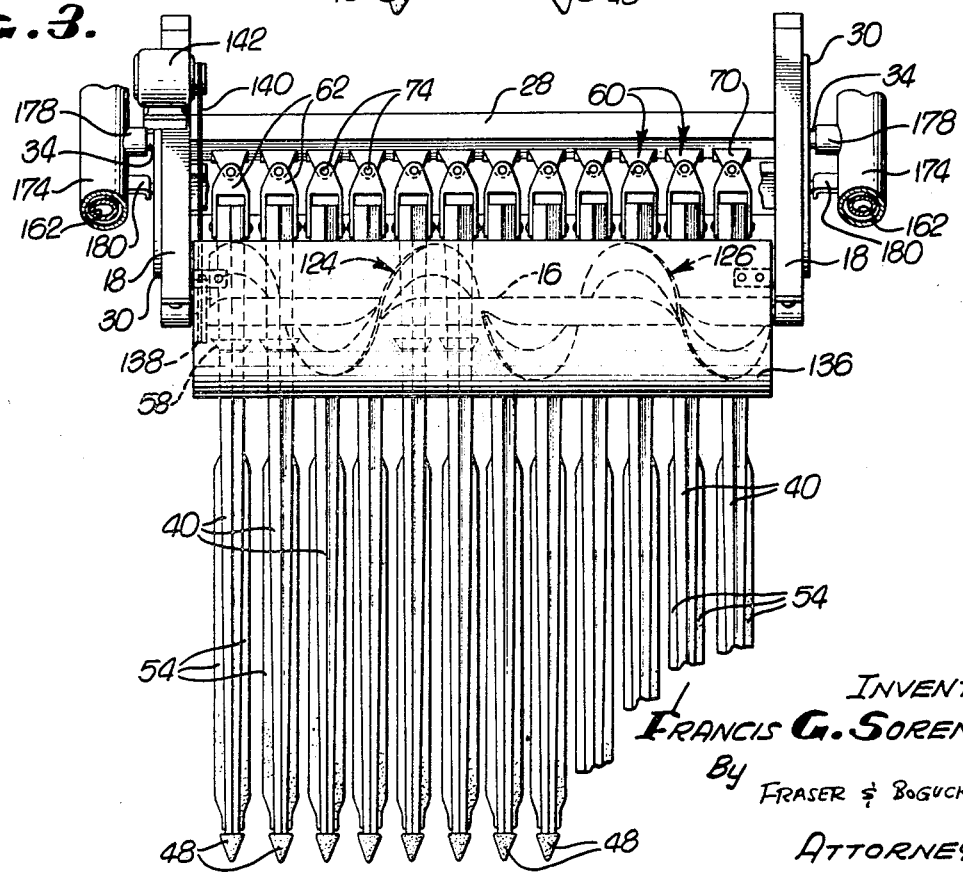
FIG. 3 is a fragmentary top view of the apparatus of FIG. 1.

Referring now to FIGS. 1, 2 and 3, the fruit harvester of the present invention includes a comb assembly 10 whose basic parts comprise a frame 12, a tine assembly 14 extending forwardly from the frame 12 and a rotatable helix assembly 16 carried by the frame 12. The frame 12 may take the form of an open, welded space frame in the shape of a triangular prism having parallel triangular ends formed from three bars 18, 20 and 22, the bars 20 and 22 meeting at a lower apex 24. The triangular ends of the frame assembly 12 are joined by several transverse elements including bars 26 and 28, the latter bar 28 coupling the apices 24 of the triangular ends. Attached to the outside of each triangular end is a sector-shaped plate 30 whose straight edges are flush with the forward and rear surfaces of the bars 20 and 22 respectively and which is provided adjacent its arcuate edge with a series of spaced apertures 32 arranged along a circular arc whose center lies at the apex 24. The frame assembly 12 further includes at each end a transverse pivot pin 34 projecting from the plate 30 and disposed concentric of the apex 24.

The tine assembly 14 includes a number of individual tines 40 which, in their normal position, are substantially parallel and lie in a common plane. The tine may be a solid or built-up structure, and made of any suitable material, for example, wood, metal or plastic. A typical tine is depicted in FIGS. 4–7. In this example, the tine is a two piece, sheet metal structure that is tapered both in plan and elevation to a small cross-sectional area at the forward extremity. The tine includes a lower, flat-bottomed channel member 42 suitably joined as by spot welding or riveting to an upper channel shaped member 44 provided with a peaked upper surface 46. As best shown in FIG. 2, tines having the shape described define between them gaps 47 having inwardly sloping sides.

The tapered configuration of the tines 40 decreases the frontal area of the tines thereby facilitating insertion of the tines into the tree crown, the probability of the tines meeting with an obstruction thereby being lessened. The front end of each tine 40 is provided with a pointed tip 48 fabricated of a soft rubber or plastic material to protect the tree and fruit from damage.

Because of the tapered configuration of the tines 40, smaller fruit may not be trapped between the tines toward the outer portions thereof. Thus, for harvesting both large and small fruit, the sides of the tines may be provided with transversely projecting flanges 54 which reduce the gaps between tines and yet do not contribute substantially to the frontal cross-sectional area. Flanges 54 are not necessary where the fruit being harvested is of uniformly large size, that is, large enough to be trapped along substantially the entire length of the gap between tines. To prevent bruising of the fruit, the flanges 54 are preferably made of a soft rubber or plastic material and the upper edge 56 of each flange is radiused (FIG. 7).

Attached to the bottom surface of each tine 40 is a plate 58 having portions projecting outwardly from the sides of the tine and provided with forward, blunt branch guiding and holding edges 59. The plates 58, as seen, for example, in FIGS. 1 and 2, are normally in alignment, and as shown in FIGS. 2–4, in the normal position of the tines 40, the outer extremities of adjacent plates 58 are separated by a small distance.

Each tine 40 is attached to the transverse bar 28 by a universal connection or swivel joint 60 permitting substantially any combination of vertical and lateral movement of the tine. Each universal swivel 60 comprises a bifurcated bracket 62 having parallel, forwardly projecting arms 64 pivotally connected to the rear end of the tine by a horizontal pin 66. A rearwardly extending portion 68 of the bracket 62 is connected by means of a vertical pivot pin 74 to a fixed bracket 70 in turn secured to the transverse bar 28 by rivet or bolt fasteners 72. Thus, vertical movement of the tine 40 takes place about the horizontal pivot pin 66 while horizontal or lateral movement of the tine 40 takes place about the vertical pin 74.

Each tine is centered and constrained to movement downwardly and laterally by a strut assembly 80 consisting of a U-shaped rod 82 hingedly connected at its upper end to a bracket 84 attached to and depending from the bottom flat surface of the tine. At its lower ends the rod 82 is connected to a fixed plate 86 carried by the transverse bar 28. Oversize openings 88 formed in the plate 86 receive the lower ends of the rod 82 and permit the rod to rock forwardly and laterally during movement of the tine.

Nut members 90 are fastened over the threaded lower extremities of each rod 82 projecting from the underside of the plate 86 thereby restraining the upward travel of the tine 40. A ring or washer 92 is welded to each arm of the rod 82 and a coil spring 94, slipped over each arm of the rod 82, is disposed between the plate 86 and the washer 92. The springs 94 are always in compression and bias the tines into their uppermost positions with the nuts 90 in engagement with the underside of the plate 86 (FIG. 5). By utilizing the U-shaped rod configuration, the upward forces on each tine provided by the springs 94 will be balanced and symmetrical and thereby will tend to center each tine, that is, maintain the longitudinal axis of each tine perpendicular to the transverse bar 28 unless a disturbing force is applied to the tine. By way of illustration, the two center tines in FIG. 2 are shown deflected outwardly and downwardly.

Tines having alternative cross-sectional configurations may be employed depending upon the type and size fruit being harvested. Typical transverse cross-sections of alternative tine embodiments 40a, 40b and 40c are shown in FIGS. 8, 9 and 10, respectively, it being understood that these alternative tines taper along their lengths in the same fashion as the tine shown in FIGS. 4 and 5.

Figures 8, 9:
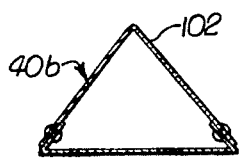
FIG. 8 is a typical, transverse cross-section view of an alternative tine which may be used in the present invention.
FIG. 9 is a typical, transverse cross-section view of another alternative tine which may be used in the present invention.
Figure 10:
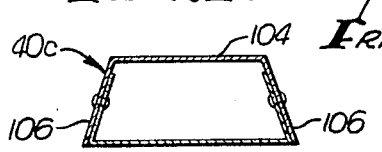
FIG. 10 is a typical, transverse cross-section view of yet another alternative tine which may be used in the present invention.

In FIG. 8, the upper surface 100 of the tine 40a has a smooth, arched shape; the tine 40b in FIG. 9 has a triangular cross-section with a peaked upper surface 102; lastly, the tine 40c in FIG. 10 has a trapezoidal cross-section with a flat upper surface 104 and sloping sides 106.

Referring now to FIGS. 1, 2, 3 and 11, it will be seen that the rotatable helix assembly 16 is mounted across the forward edge of the frame assembly 12 just above the upper extremities of the tines 40 in the uppermost position (FIG. 1). The helix assembly 16 includes a central shaft 116 journaled at its ends in bearings 118 mounted by bolts 119 on angularly disposed plates 120 secured to the frame assembly ends. The plates 120 are provided with a series of vertically spaced holes 122 for receiving the bearing mounting bolts 119 so that the vertical position of the helix assembly 16 may be preset prior to harvesting to accommodate larger or smaller fruit, the assembly 16 being moved upwardly in the case of larger diameter fruit.

The rotatable helix assembly 16 has a first helix 124 disposed about one-half of the length of the shaft 166 and a second helix 126, oppositely pitched to the first helix 124, disposed about the other half of the length of the shaft 116.

As best shown in FIG. 2, each helix 124, 126 is fashioned from a flat, flexible material such as neoprene sheet ¼ inch thick and provided with generally radially extending slits 128 to form a plurality of adjacent segments 130. The helices 124 and 126 are held in place and constrained to their helical shape by helical sheet metal mounts 132 and 134, respectively, secured to the central shaft 116 by a number of brackets 132. As will be seen in FIG. 2, the leading corner 135 of each segment 130 is rounded so that no sharp edges come into contact with the fruit to thereby minimize fruit loss.

An arcuate shroud 136 positioned over the helices 124, 126 prevents branches from being entangled in the helices and also prevents any fruit which may be carried upwardly by the action of the helices from being lost or damaged. The front edge 137 of the shroud 136 is spaced a sufficient distance above the upper extremities of the tines to provide clearance for the fruit being harvested.

The helix assembly 16 is driven by means of a pulley 138 mounted at one end of the shaft 116 rotated, via a belt 140, by a drive means such as an electric motor 142 supported by the frame assembly.

In one practical example, the pitch of each helix 124, 126 is 12 inches, the diameter of each helix is 7 ½ inches and the helix assembly is rotated at a speed that is fast enough to cause efficient separation of the fruit from the branches but not fast enough to cause injury to the fruit, and this speed will vary as a function of the type of fruit being picked.

The comb assembly 10 may be mounted in a number of different ways to facilitate its transportation to the harvesting site and its movement through each tree.

One such arrangement is shown in FIG. 1 and includes a platform 156 which may be transported by truck or mounted on wheels 158. The platform 156 comprises a base 160 supporting laterally spaced stanchions 162 connected at their upper extremities by a heavy cross member 164 which supports, at its center, a pulley 166. A post 168 is mounted at the rear of the base 160 and supports a winch mechanism 170 whose cable 172 extends over the pulley 166 for attachment to the frame 12 of the comb assembly 10. Tubular members 174, telescoped over the stanchions 162 and including circumferentially spaced end guide wheels 176 engaging the stanchions 162, are free to travel up and down the stanchions. Welded to the lower portion of each tubular member 174 is a horizontal sleeve bearing 178 for receiving the pivot pin 34. A bracket 180 welded to each tubular member 174 carries a pin 182 for insertion in the appropriate aperture 32 to preset the angle of the plane of the tines relative to the horizontal. In FIG. 1, it will be seen that the plane of the tines, in the undeflected position, can be preset between about 0°, that is, horizontal as indicated by broken line 184, to an angle of about 75° as shown by broken line 186, depending on which aperture 32 is selected. A shallower angle is used for harvesting fruit from younger trees which have flexible branches and foliage tends to be relatively sparse; the plane of the tines is preset at a steeper angle for combing older trees which tend to have more dense foliage and less flexible branches.

A receptacle 188, of canvas or other suitable material, is attached across the rear portion of the frame assembly to catch and guide the fruit to a conveyor system (not shown) through a large diameter conduit 190.

The mobile platform apparatus of FIG. 1 essentially limits the movement of the comb assembly in a vertical direction. It may be desirable to be able to move the comb assembly forwardly to further penetrate the crown of the tree or to move it rearwardly to harvest only the fruit at the outer periphery. To obtain this increased flexibility, the comb assembly may be mounted on a small vehicle, such as the fork lift 192, as illustrated in FIG. 12. In this example, the comb assembly, designated generally by the reference numeral 10a, may be moved up or down by the operator of the fork lift. A conduit 190a connects the receptacle 188a to a suitable conveyor 194 for carrying the fruit from the conduit 190a into an adjacent truck (not shown).

Figure 11:
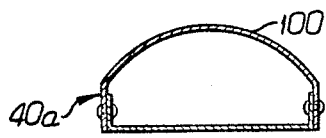
FIG. 11 is a schematic front view of the double helix assembly of the apparatus of FIG. 1.

With the aid of the schematic representations of FIGS. 11 and 13, the operation of the fruit harvester of the present invention will now be described. Initially, the angle of the plane of the tines, the height of the helices 124, 126 and the height of the shroud 136 are preset to accommodate the tree and the particular type of fruit to be harvested. The helix assembly drive means, such as the motor 142, is turned on. The apparatus, mounted on a fork lift, for example, as shown in FIG. 12, is then ready to be moved through the crown of the tree.

FIG. 13 shown three basic harvesting patterns. As shown by the part solid, part broken line 200, 202, the comb assembly may be moved upwardly through the tree in an essentially straight, vertical line. As an alternative, shown by the stepped solid line 200, the comb assembly may be moved upwardly for a given distance, then the vehicle advanced so that the comb assembly penetrates further into the tree and then upwardly again. As a further alternative, a slanting pattern may be employed as shown by the dashed line 204. To obtain this pattern, the comb assembly 10 is moved upwardly by the fork lift device while the vehicle is simultaneously moved slowly toward the center of the tree.

As the comb assembly is advanced through the tree crown, the fruit in the path of the comb will become trapped between the tines. Some of this fruit will be separated from the branches by the movement of the comb assembly along and this fruit will roll and/or slide freely down the troughs defined by the adjacent tines and ejected rearwardly into the receptacle 188a by the action of the rotating helix assembly.

Most of the fruit trapped by the comb assembly, however, will remain attached to the branches. This fruit will side rearwardly between the entrapping tines. When the fruit comes into contact with the helix, the rotating helix pushes the fruit rearwardly and simultaneously imparts a circular or twisting motion to the fruit to separate it from the branches in cooperation with the plates 58 engaged by the branches. The leading edges of the plates 58 guide the branches into position and momentarily hold the branches in position as the rotating helix engages the fruit and imparts to it a twisting and rearwardly directed movement to effect separation. It will be apparent from FIG. 11 that, with a given direction of rotation of the shaft 116, the fruit tends to be urged toward the center of the apparatus, as shown by the arrows 206 in FIG. 11, so that none of the fruit is lost through the sides of the apparatus.

Any major obstructions met by any of the tines will cause the tine to pivot downwardly and/or laterally as necessary to clear the obstruction without having to withdraw the assembly. Once clear of the interference, the deflected tine returns immediately to its original position by the action of the spring biased strut assembly 80. In this fashion, a continuous sweep of the tree crown is made possible.

The apparatus of the present invention is simple, needs only one operator and causes little or no damage to either the fruit or tree. Further, because this apparatus is capable of a continuous sweep with deep penetration, it can harvest substantially all of the fruit in a given tree in only four or five sweeps.

What is claimed is:

1. A fruit-harvesting apparatus comprising:
    a frame including end members and transverse bars joining said end members;
    a comb assembly adapted to be moved through the crown of a fruit-bearing tree, said assembly including a plurality of forwardly projecting tines pivotally connected to one of said transverse bars and resiliently biased into normally substantially coplanar parallel relation, said tines having forward and rear extremities, said tines normally being spaced to trap fruit of at least a given size and shaped to define channels between adjacent tines for guiding the travel of fruit toward said rear extremities, each said tine being pivotally mounted adjacent its rear extremity to deflect upon engaging an obstruction to thereby clear said obstruction during movement of said comb assembly through said tree, each said tine carrying a plate projecting laterally therefrom to guide and hold fruit-bearing branches and thereby assist the separation of said fruit from said branches;
    a rotatable helix assembly carried by a transverse axle journaled in bearing means carried by said frame end members, said helix assembly including a pair of adjacent, oppositely pitched helices mounted on said axle for rotation in the same direction and including pliable, segmented edges to minimize damage to the fruit, rotation of said assembly simultaneously imparting rotation and rearward motion to said fruit carried by said tines, said rotation of said fruit tending to urge said fruit toward the center of said comb assembly, said comb assembly further including a transverse, arcuate shroud disposed over said helices, said shroud having a forward edge spaced a sufficient distance above the upper extremities of said tines to provide clearance for the fruit being harvested;
    means extending across the rear of said frame for collection of the separated fruit; and
    means connected to said frame for transporting said fruit-harvesting apparatus and including means for raising and lowering said apparatus for directing said comb assembly for movement through the crown of fruit-bearing trees.

2. Apparatus, as defined in claim 1, in which: said transporting means includes am movable platform having a pair of spaced, upright stanchions, sleeves disposed about said stanchions and movable vertically therealong, each of said frame ends having outwardly projecting pins received by a corresponding sleeve whereby said frame, comb assembly, helix assembly and collection means may be pivoted as a unit to vary the angle of the plane of said tines relative to the horizontal, and means coupling said sleeve and frame for selecting said angle of the plane of said tines.

3. Apparatus, as defined in claim 1, in which: said transporting means includes a fork lift carrying said fruit-harvesting apparatus whereby said apparatus may be transported from tree to tree and raised and lowered as required to move said comb assembly through the crown of said trees.

4. In an apparatus for harvesting tree fruit, a comb assembly including a plurality of projecting, spaced, pivotally mounted tines, said assembly being adapted to be moved through said tree with a combing action to engage at least some of said fruit thereby, said tines being individually movable for deflection, as necessary, to clear obstructions in said tree upon contact therewith;
    means operatively associated with said comb assembly for imparting rotation to said fruit engaged by said assembly to twist said fruit and thereby separate said fruit from said tree; and
    plate means mounted on said tines and projecting laterally therefrom to guide and hold fruit-bearing branches and thereby assist the separation of said fruit by said rotation-imparting means.

5. In a fruit-harvesting apparatus adapted to be moved through fruit-bearing trees, the combination comprising:
    frame means;

a plurality of tines connected at one of their ends by pivot means to said frame means and extending therefrom, said pivot means lying substantially along a horizontal line, said tines carrying means for holding the fruit bearing branches and thereby assist the separation of said fruit from said branches;

spring bias means coupling said tines and said frame means and normally biasing said tines into substantially coplanar, parallel, spaced apart relation, each said tine being individually movable in pivotal fashion relative to said frame means whereby obstructions may be cleared upon contact during movement of said apparatus through a tree, said tines defining, in the substantially parallel, coplanar position, channels for guiding the travel of fruit engaged between said tines; and rotatable means positioned immediately above said tines for imparting rotation to said fruit to separate from said tree, by twisting and in cooperation with said branch holding means any fruit disposed in said channels and not already separated by the action of said tines moving through said tree.

6. An assembly, as defined in claim 5, in which:
each of said tines is tapered along its length, the forward extremity of said tine having a smaller cross sectional area than the rear extremity, said forward extremity including a resilient tip for preventing damage to said fruit and tree.

7. An assembly, as defined in claim 6, which includes:
transverse flanges projecting from the sides of each of the tines to extend the range of fruit size which can be trapped between the tines, said flanges extending rearwardly from adjacent said forward extremity approximately one-half the length of said tines.

8. An assembly, as defined in claim 6, in which:
each of said tines includes a horizontal bottom surface, vertical side surfaces extending upwardly from said bottom and a peaked top surface.

9. An assembly, as defined in claim 6, in which:
each of said tines includes a horizontal bottom surface, vertical side surfaces extending upwardly from said bottom surface and a convex top surface.

10. An assembly, as defined in claim 6, in which:
each of said tines has a triangular cross section including a horizontal bottom surface and inclined side surfaces meeting at an apex.

11. An assembly, as defined in claim 6, in which:
each of said tines has a trapezoidal cross section including horizontal, parallel top and bottom surfaces and inclined side surfaces joining said top and bottom surfaces.

12. In a fruit-harvesting apparatus:
a comb assembly adapted to be moved through the crown of a fruit-bearing tree, said assembly including horizontal frame means and a plurality of tines for trapping said fruit, each said tine being connected to said frame means by universal pivot means and carrying laterally projecting means for guiding the fruit-bearing branches and holding said branches while said fruit is being separated from said branches; and rotatable means positioned above said tines and shaped to impart both rotation and a rearward movement to said fruit disposed between said tines and in cooperation with said branch guiding and holding means, separate said fruit from said branches.

13. Apparatus, as defined inc claim 12, in which:
said means for guiding and holding said branches comprises a plate attached to each of said tines, said plate having forward, bilateral edges tapered rearwardly whereby the forward edges of adjacent plates guide and hold said branches momentarily while said fruit is being separated; and said rotatable means comprises a helix assembly having an axis of rotation transverse of said tines.

14. Apparatus, as defined in claim 13, in which:
said helix assembly includes a pair of adjacent, oppositely pitched helices mounted on a common shaft for rotation in the same direction and including pliable, segmented edges to minimize damage to the fruit, rotation of said assembly simultaneously imparting rotation and rearward motion to said fruit, said rotation of said fruit tending to urge said fruit toward the center of said comb assembly.

15. Apparatus, as defined in claim 14, which includes:
a transversely extending arcuate shroud over said helix assembly, said shroud having a forward edge spaced a sufficient distance above the upper extremities of said tines to provide clearance for the fruit being harvested.

* * * * *